D. J. ARNOLD.
Earth-Auger.
No. 161,374. Patented March 30, 1875.
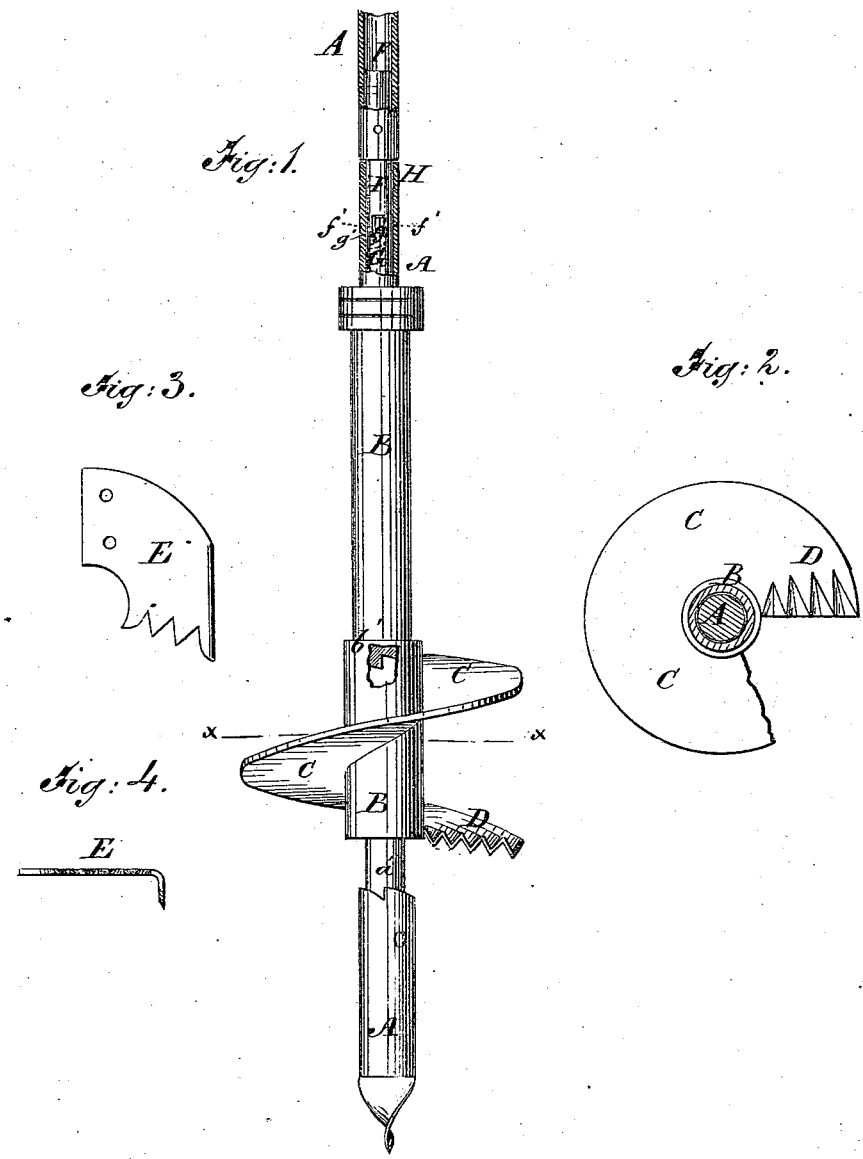

UNITED STATES PATENT OFFICE.

DON JUAN ARNOLD, OF BROWNVILLE, NEBRASKA.

IMPROVEMENT IN EARTH-AUGERS.

Specification forming part of Letters Patent No. 161,374, dated March 30, 1875; application filed August 22, 1874.

*To all whom it may concern:*

Be it known that I, DON JUAN ARNOLD, of Brownville, in the county of Nemaha and State of Nebraska, have invented a new and useful Improvement in Earth-Augers of which the following is a specification:

Figure 1 is a side view of my improved earth-auger, the bit being shown as slightly raised, and part being broken away to show the construction. Fig. 2 is a cross-section of the same, taken through the line $xx$, Fig. 1. Fig. 3 shows a modification of the same. Fig. 4 is an edge view of the bit shown in Fig. 3.

Similar letters of reference indicate corresponding parts.

The invention will first be fully described, and then pointed out in the claim.

A represents the shaft, the lower end of the lower section of which is made with a screw-point, so that it may readily work its way into the ground. The lower part of the lower section of the shaft A is enlarged, and has one or more ratchet or clutch teeth, $a'$, formed in the upper end or shoulder of said enlargement, as shown in Fig. 1. B is the tubular shank of the auger, the lower part of which is enlarged to correspond with the enlargement of the lower end of the shaft A; and in the interior shoulder of said enlargement are formed one or more ratchet or clutch teeth, $b'$, to correspond with and mesh into the teeth $a'$ of the shaft A.

By this construction, as the auger is lowered upon the shaft A the teeth $a'$ $b'$ will come into mesh with each other, and the said shaft will carry the said auger with it in its revolution.

Upon the lower or enlarged part of the tubular shaft B is formed, or to it is attached, a spiral flange, C, upon the lower end of which is formed, or to it is attached, a bit, D, the edge of which is made fluted, as shown in Figs. 1 and 2, to cause it to take hold of and work its way into the hardest ground. The edge of the bit E (shown in Figs. 3 and 4) is notched, and has a downwardly-projecting lip formed upon its outer corner, as shown in Fig. 4.

Having thus described my invention, I claim as new and desire to secure by Letters Patent—

The spiral flange C, provided with a series of V-shaped cutters, arranged on an inclination outward toward the circumferential edge of auger, as shown and described.

DON JUAN ARNOLD.

Witnesses:
  C. W. WHEELER,
  I. B. DOCKER.